(12) United States Patent
Na et al.

(10) Patent No.: US 8,228,610 B2
(45) Date of Patent: Jul. 24, 2012

(54) LENS INJECTION MOLD

(75) Inventors: Jin Wook Na, Gyunggi-do (KR); Young Ro Jeon, Gyunggi-do (KR); Sun Ok Kim, Seoul (KR); Sung Hwan Choi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/929,479

(22) Filed: Jan. 27, 2011

(65) Prior Publication Data
US 2011/0205642 A1 Aug. 25, 2011

(30) Foreign Application Priority Data
Feb. 23, 2010 (KR) .................. 10-2010-0016251

(51) Int. Cl.
*G02B 7/00* (2006.01)
*B29D 11/00* (2006.01)
(52) U.S. Cl. ........................ 359/642; 264/2.5
(58) Field of Classification Search .................. 359/642, 359/631, 819
See application file for complete search history.

(56) References Cited

U.S. PATENT DOCUMENTS
6,319,433 B1* 11/2001 Kohan .................. 264/1.32
2004/0165288 A1* 8/2004 Daikoku .................. 359/819
2006/0098295 A1 5/2006 Yamanaka FOREIGN PATENT DOCUMENTS
JP 1-183612 7/1989
JP 2006-131467 5/2006
KR 10-2009-0075042 7/2009

OTHER PUBLICATIONS
Korean Office Action issued Jul. 29, 2011 in corresponding Korean Patent Application 10-2010-0016251.

* cited by examiner

*Primary Examiner* — James Jones

(57) ABSTRACT

A lens injection mold includes an upper mold and a lower mold, a cavity provided in the upper mold or the lower mold and having a shape corresponding to the rib portion having the concave portions in order to form the rib portion, and an upper core and a lower core disposed to be movable inside the upper mold and the lower mold and having an upper tip portion and a lower tip portion, respectively, the tip portions having a shape corresponding to the effective aperture portion such that the effective aperture portion is created by pressing injection liquid.

2 Claims, 2 Drawing Sheets

LENS INJECTION MOLD

CROSS-REFERENCE TO RELATED APPLICATIONS

This application claims the priority of Korean Patent Application No. 10-2010-0016251 filed on Feb. 23, 2010, in the Korean Intellectual Property Office, the disclosure of which is incorporated herein by reference.

BACKGROUND OF THE INVENTION

1. Field of the Invention

The present invention relates to a plastic lens, a lens module and a lens injection mold.

2. Description of the Related Art

In general, plastic optical lenses are used in the form of a lens module. The lens module is manufactured in such a manner that an optical lens is formed by injection molding or the like and is then assembled in a unit receiving the lens (barrel, housing, or the like) automatically or by a user.

In recent years, a subminiature lens module has been used in various applications such as in a cellular phone, a webcam and a security camera. In response to high pixel requirements due to the improved integration of a sensor, precise assembly is required so as to accurately adjust the position of an optical axis in the formation of a precision lens having a minimum error in shape and a module using the precision lens.

A plastic lens, manufactured by injection molding, has a non-axisymmetric shape since a gate portion thereof is cut after the injection molding. When such a non-axisymmetric lens is assembled in a barrel by a press-fitting process, it is contracted and deformed so that a center of an optical axis of an effective aperture portion is altered.

A conventional lens, manufactured by injection molding, contracts asymmetrically due to its non-axisymmetric shape since it is subjected to contraction load inside a barrel while a gate-cut portion thereof is not affected by the load. Particularly, an error in shape may be caused in the direction of the gate-cut portion and the direction perpendicular thereto, so that precise formation is difficult.

Also, when an outer circumferential surface of a circular rib portion is pressed and fitted into an inner circumferential surface of a barrel, excessive press-fitting force is applied thereto. This causes tilting and plastic deformation of the lens and the barrel receiving the lens during the press-fitting process.

SUMMARY OF THE INVENTION

An aspect of the present invention provides a plastic lens, a lens module and a lens injection mold. When the lens is assembled in a barrel by being pressed and fitted therein, it is subjected to symmetrical and reduced contraction load, and accordingly, an error in shape is minimized.

According to an aspect of the present invention, there is provided a plastic lens including: an effective aperture portion being an optical surface of the lens; and a rib portion being a circumferential portion of the lens, wherein the rib portion has a portion in contact with an inner circumferential portion of a barrel, the effective aperture portion and the rib portion are shaped in concentric circles having the same central axis, and the rib portion includes three or more concave portions in an outer circumferential portion thereof, the concave portions being positioned to be symmetrical with respect to the central axis.

The concave portions may have the same size and shape.

The concave portions may have an outer surface formed as a flat or curved surface.

The concave portions may have an inscribed circle larger than the effective aperture portion.

According to another aspect of the present invention, there is provided a lens module including the plastic lens assembled in a barrel by being pressed and fitted therein.

According to another aspect of the present invention, there is provided a lens injection mold for injection molding of the plastic lens, the lens injection mold including: an upper mold and a lower mold; a cavity provided in the upper mold or the lower mold and having a shape corresponding to the rib portion having the concave portions in order to form the rib portion; and an upper core and a lower core disposed to be movable inside the upper mold and the lower mold and having an upper tip portion and a lower tip portion, respectively, the tip portions having a shape corresponding to the effective aperture portion such that the effective aperture portion is created by pressing injection liquid.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

In order to solve the problems of a conventional lens module, the following conditions in the design of a plastic lens according to the present invention are presented.

First, the shape of a lens should be symmetrical with respect to a central axis of the lens.

Second, a contact area between an outer circumferential surface of a rib portion of a lens and an inner circumferential surface of a barrel should be reduced.

According to the related art, when a conventional non-axisymmetric lens being assembled in a barrel contracts asymmetrically due to asymmetric press-fitting force applied thereto, discrepancy between a center of an effective aperture portion of the lens and a center of the barrel may be caused. In order to improve the discrepancy, the lens of the present invention is designed to be symmetrical with respect to the central axis of the lens.

Also, a conventional lens being assembled in a barrel may be subjected to tilting or plastic deformation due to excessive press-fitting force applied thereto. In order to avoid this, the lens of the present invention is designed to have a reduced contact area between the outer circumferential surface of the rib portion of the lens and the inner circumferential surface of the barrel.

The shape conditions of a lens satisfying the above two conditions are given in detail, as follows:

First, an effective aperture portion and a rib portion of the lens should have the form of concentric circles having the same central axis.

Second, an outer circumferential portion of the rib portion of the lens should have three or more concave portions being symmetrical with respect to the central axis of the lens.

Third, all the concave portions should have the same size and shape.

Fourth, an outer surface of the concave portion may be formed as a flat or curved surface.

Fifth, an inscribed circle of the concave portions should be larger than the effective aperture portion of the lens.

FIGS. 1A through 1D illustrate examples of the shape of a plastic lens satisfying the above-described conditions.

A lens of the present invention includes an effective aperture portion 120 forming an optical surface of the lens, and a rib portion 140 forming a circumferential portion of the lens.

Figure 1A:
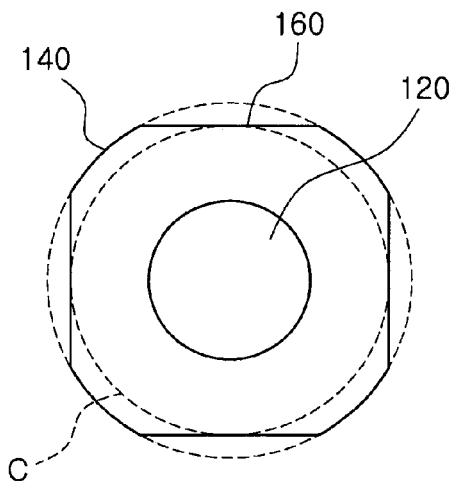
FIGS. 1A through 1D illustrate examples of the shape of a plastic lens according to an exemplary embodiment of the present invention.

A lens shown in FIG. 1A includes the effective aperture portion 120 and the rib portion 140 that have the form of concentric circles, in which the rib portion 140 includes four concave portions 160 in an outer circumferential portion thereof in such a manner that the concave portions 160 are symmetrical with respect to a concentric axis at 90 degree intervals. The four concave portions 160 have the same size and shape, and an outer surface thereof is formed as a flat surface. Since an inscribed circle C of the concave portions 160 is larger than the effective aperture portion 120 of the lens, this allows the concave portions 160 not to invade the effective aperture portion 120 of the lens, and the performance of the lens is not affected thereby.

Such a plastic lens may avoid asymmetric contraction inside the barrel since it is designed to be symmetrical with respect to the concentric axis. Also, since the concave portions 160 of the lens, when assembled in the barrel, do not contact an inner circumferential surface of the barrel, press-fitting force in the assembly thereof is reduced so that the lens may avoid deformation caused by excessive press-fitting force applied thereto.

Figure 1B:
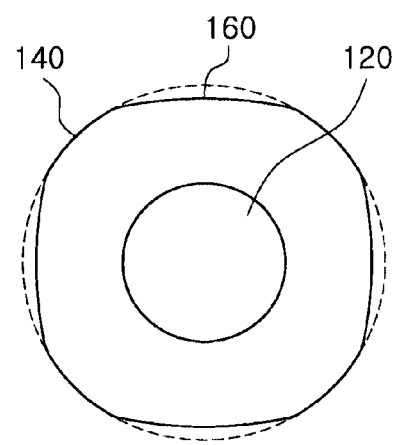

A lens shown in FIG. 1B has the same form as that of the lens shown in FIG. 1A in that it has four concave portions 160 being symmetrical in the outer circumferential portion of the rib portion 140. However, the outer surface of the concave portion 160 in the lens of FIG. 1A is formed as a flat surface, whereas an outer surface of the concave portion 160 in the lens of FIG. 1B is formed as a curved surface having a radius of curvature greater than that of the outer circumferential surface of the rib portion 140.

Figure 1C:
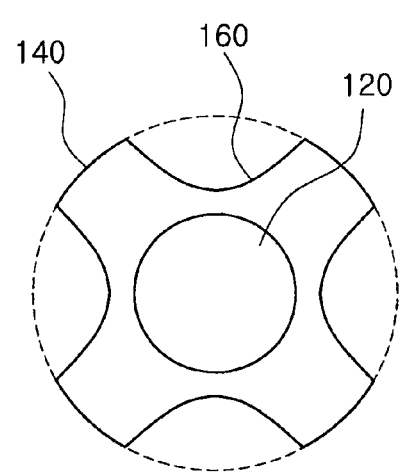

A lens shown in FIG. 1C has the same form as that of the lens shown in FIG. 1B in that it has four concave portions 160 being symmetrical in the outer circumferential portion of the rib portion 140. However, the outer surfaces of the concave portions 160 in the lens of FIG. 1B protrude outwardly, whereas the outer surfaces of the concave portions 160 in the lens of FIG. 1C are formed inwardly.

Figure 1D:
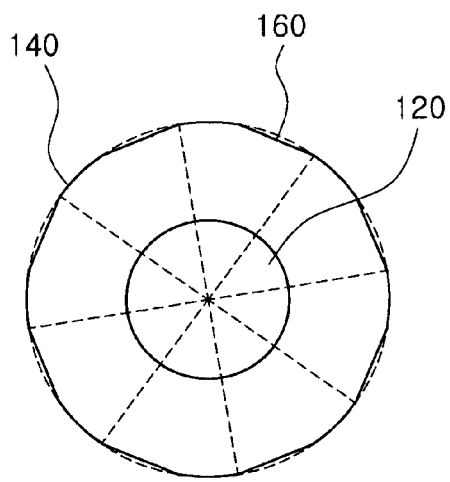

A lens shown in FIG. 1D includes eight concave portions 160 being symmetrical in the outer circumferential portion of the rib portion 140. An outer surface of the concave portion 160 is formed as a flat surface. That is, when the lens of FIG. 1D is compared with the lens of FIG. 1A, they are identical in the outer surface of the concave portion 160 formed as a flat surface, but are different in the number of concave portions 160.

In the above-mentioned examples, a contact area between the outer circumferential portion of the rib portion 140 and an inner circumferential portion of the barrel may be present.

A lens satisfying the above five shape conditions may be in various forms. As long as a lens satisfies the above five shape conditions, the lens may avoid asymmetric contraction inside the barrel as well as deformation caused by press-fitting force applied thereto due to a reduction of the press-fitting force in the assembly thereof.

Figure 2:
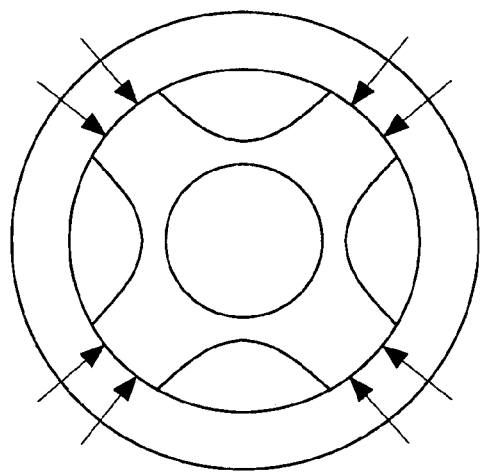
FIG. 2 illustrates that the lens of FIG. 1C being assembled in a barrel is subjected to contraction load.

FIG. 2 illustrates that the lens of FIG. 1C being assembled in the barrel is subjected to contraction load. As shown in FIG. 2, the lens is symmetrically subjected to contraction load. Here, the lens may have a greatly reduced load applied thereto as compared with a conventional lens being subjected to an omnidirectional contraction load.

Hereinafter, a method of forming a plastic lens according to an exemplary embodiment of the present invention will be described.

Figure 3:
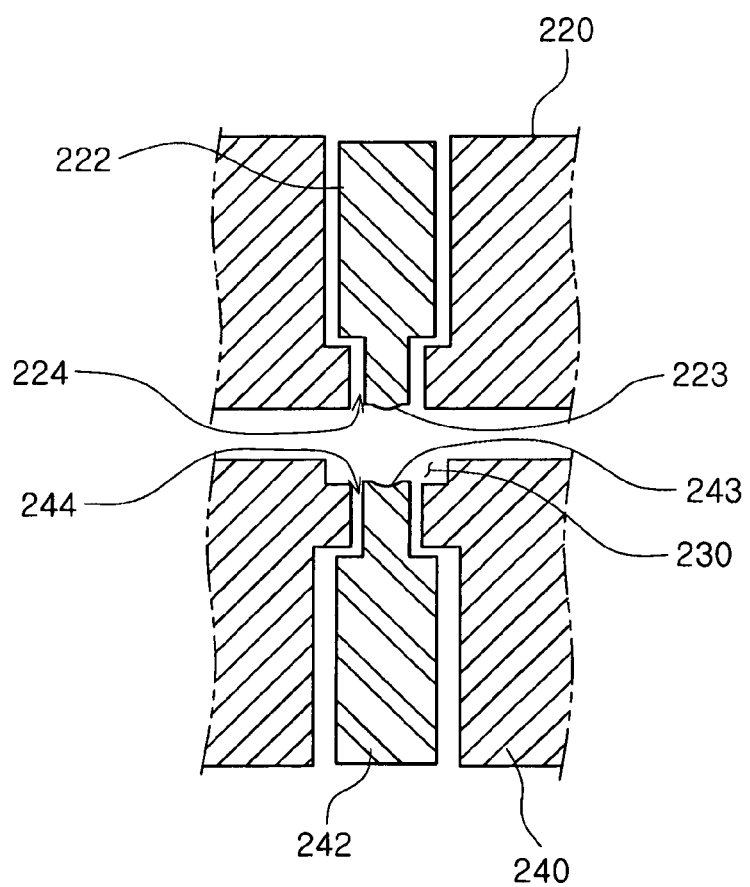
FIG. 3 is a side cross-sectional view illustrating a lens injection mold according to an exemplary embodiment of the present invention.

FIG. 3 is a side cross-sectional view illustrating a lens injection mold according to an exemplary embodiment of the present invention.

As shown in FIG. 3, a lens injection mold includes an upper mold 220, a lower mold 240, an upper core 222, a lower core 242, an upper core insertion portion 224, a lower core insertion portion 244, and a cavity 230.

The upper mold 220 and the lower mold 240 are used to manufacture a lens with injection liquid. One of the upper mold 220 and the lower mold 240 may be a fixed mold, and the other one thereof may be a movable mold.

The upper mold 220 and the lower mold 240 include an upper tip portion 223 and a lower tip portion 243, respectively, in such a manner that the upper tip portion 223 and the lower tip portion 243 have a shape corresponding to an inner surface and an outer surface of the effective aperture portion 120, respectively, in order to form the effective aperture portion 120. By changing the shapes of the tip portions 223 and 243, a concave lens or a convex lens may be formed accordingly.

The upper core insertion portion 224 and the lower core insertion portion 244 provide a space allowing for the insertion and movement of the upper core 222 and the lower core 242.

The cores 222 and 242 and the core insertion portions 224 and 244 may be formed in a cylindrical shape. The cores 222 and 242 may be allowed to move inside the core insertion portions 224 and 244 for the compression of the lens.

The cavity 230 may be formed in a shape corresponding to the rib portion 140 of the lens for the formation of the rib portion 140. Since the rib portion 140 of the present invention has the concave portions 160 in the outer circumferential portion thereof, the cavity 230 should be formed in a shape corresponding to the rib portion 140 having the concave portions 160 formed therein.

In this embodiment, the cavity 230 is formed in the lower mold 240, but it may be formed in the upper mold 220.

When the injection liquid is provided to the cavity 230, the upper core 222 and the lower core 242, disposed inside the upper mold 220 and the lower mold 240, are moved to compress the injection liquid so that the lens can be formed.

Meanwhile, a plastic lens according to the present invention may be manufactured by a press forming method besides an injection molding method. In the case of the press forming method, a lens having a desired shape may be manufactured by putting an optical material in a mold and performing the pressing thereof.

As set forth above, according to exemplary embodiments of the invention, a plastic lens is designed to be symmetrical with respect to a concentric axis so that it may avoid asymmetric contraction inside a barrel. Also, since concave portions of the lens, when assembled in the barrel, do not contact an inner circumferential surface of the barrel, press-fitting force in the assembly thereof is reduced so that deformation of the lens caused by excessive press-fitting force applied thereto may be avoided.

While the present invention has been shown and described in connection with the exemplary embodiments, it will be apparent to those skilled in the art that modifications and variations can be made without departing from the spirit and scope of the invention as defined by the appended claims.

What is claimed is:

1. A lens injection mold for injection molding of the plastic lens having an effective aperture portion being an optical surface of the lens, and a rib portion being a circumferential portion of the lens, having a portion in contact with an inner circumferential portion of a barrel, and including three or more concave portions in an outer circumferential portion thereof, the effective aperture portion and the rib portion being shaped as concentric circles having the same central axis, and the concave portions being positioned to be symmetrical with respect to the central axis and having the same size and shape, the lens injection mold comprising:
    an upper mold and a lower mold;
    a cavity provided in the upper mold or the lower mold and having a shape corresponding to the rib portion having the concave portions in order to form the rib portion; and
    an upper core and a lower core disposed to be movable inside the upper mold and the lower mold and having an upper tip portion and a lower tip portion, respectively, the tip portions having a shape corresponding to the effective aperture portion such that the effective aperture portion is created by pressing injection liquid.

2. A lens injection mold for injection molding of a plastic lens having an effective aperture portion being an optical surface of the lens, and a rib portion being a circumferential portion of the lens, having a portion in contact with an inner circumferential portion of a barrel, and including three or more concave portions in an outer circumferential portion thereof, the effective aperture portion and the rib portion being shaped in concentric circles having the same central axis, and the concave portions being positioned to be symmetrical with respect to the central axis, the lens injection mold comprising:
    an upper mold and a lower mold;
    a cavity provided in the upper mold or the lower mold and having a shape corresponding to the rib portion having the concave portions in order to form the rib portion; and
    an upper core and a lower core disposed to be movable inside the upper mold and the lower mold and having an upper tip portion and a lower tip portion, respectively, the tip portions having a shape corresponding to the effective aperture portion such that the effective aperture portion is created by pressing injection liquid.

* * * * *